July 2, 1935.    O. B. ARNTZEN    2,006,531
TANK FLOAT GAUGE
Filed Jan. 17, 1933
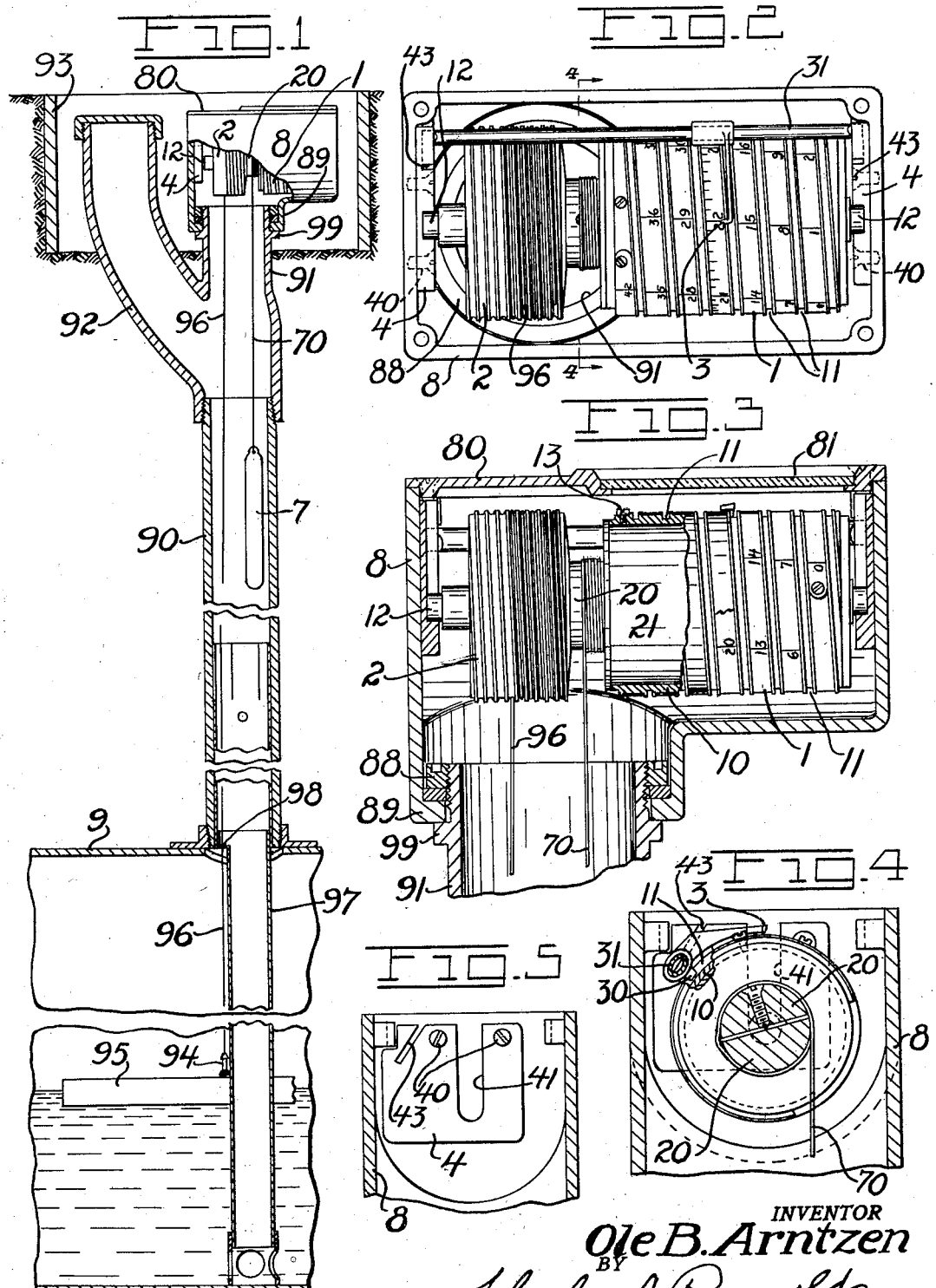
INVENTOR
Ole B. Arntzen
BY Charles L. Reynolds
ATTORNEY Patented July 2, 1935

2,006,531

UNITED STATES PATENT OFFICE 2,006,531

TANK FLOAT GAUGE

Ole B. Arntzen, Seattle, Wash., assignor to Gray-Arntzen Co., a corporation of Washington Application January 17, 1933, Serial No. 652,117

5 Claims. (Cl. 73—82)

My invention relates to gauges intended for use in conjunction with a float within a tank. It is particularly intended as a gauge for use in conjunction with subterranean tanks, and it is my object to provide a tank float gauge which will accurately measure the depth or volume of liquid within the tank, though the tank is not accessible, and regardless of inaccuracies in installation, due to settling of the tank, or like reasons.

More especially it is an object to provide a tank float gauge having means whereby the relative positions of the scale and index can be adjusted to compensate for inaccuracies, due to the causes mentioned or others.

It is also an object to devise a tank float gauge of simple construction, and one which is inexpensive to manufacture and install.

It is a further object to provide a gauge of the general character indicated which can be sealed up and from which the several parts can be quickly and easily removed when it is desired to have access to the tank through the connecting pipe or to withdraw the float in cases where a removable float is employed.

With these and other objects in mind, as will hereafter appear, my invention comprises the novel parts, and the novel combination and arrangement thereof, as shown in the accompanying drawing, described in this specification, and as will be more particularly ascertained from a study of the drawing, specification, and claims forming part of this application.

In the accompanying drawing I have shown my invention embodied in a form which is at present preferred by me, it being understood that the principles thereof, more especially as defined in the claims, may be incorporated in various gauges within the scope of this invention.

Figure 1 is a sectional view through a tank system with the gauge and float installed therein.

Figure 2 is a plan view of the gauge and gauge box, the cover of the latter being removed.

Figure 3 is an axial vertical section through the gauge box, illustrating the gauge in elevation, parts being broken away.

Figure 4 is a transverse section through the gauge substantially on the line 4—4 of Figure 2.

Figure 5 is an inside elevation of a bearing plate at the end of the gauge box.

It will be readily understood that the gauge may be employed in various installations and in connection with various other devices, but since it is designed for and is especially well adapted for use in subterranean installations, I have shown the same in connection with such an installation, in Figure 1. Here the tank 9 is buried in the ground, and a pipe 90 extends upward therefrom. At its upper end the pipe branches, the branch 91 continuing onward as an axial extension of the pipe 90, and a wye 92 branches off to one side to serve as the filler pipe. The two branches 91 and 92 preferably extend within a meter box 93 sunk below the surface of the ground, and within this meter box there is secured upon the upper end of the branch 91 a gauge box 8, upon which may be secured a cover 80. Means (not shown) may be provided for locking the cover in place. A portion 81 of this cover may be glass to give a ready view of the gauge beneath.

The float 95 within the tank 9 has secured to it a line 96 which extends upward through the pipe 90 to within the gauge box 8. For reasons which will appear more fully in connection with my companion application, Serial No. 652,116, filed on the same day as the present application, it is desirable to provide a pipe 97 as an extension within the tank 9 of the lower end of the pipe 90, this extension 97 reaching substantially to the bottom of the tank, at least below the surface of the liquid therein, and the line 96 passes through a shoulder 98 provided in this inserted pipe extension 97.

Within the gauge box is supported a drum 2, preferably helically grooved, and of the same diameter throughout. Upon this is secured an end of the float line 96, and as the float rises, more and more of the line 96 is wound upon the drum 2, means being provided for rotating the drum and for keeping the float line tight when the float rises. Such a means may conveniently be a counterweight 7 having a line 70 secured to it and extending about a second drum 20. I prefer that this second drum 20 be of less diameter than the drum 2; consequently the counterweight 7 will have less vertical movement than the float 95.

Associated with and movable by the drum 2, or corresponding float-controlled member, is a scale 1. In the form shown this scale is a helically disposed tape or the like. Preferably it is wound upon or formed as part of a sleeve 10, which sleeve has cut in it a helical groove 11. The sleeve 10 is received upon a cylinder 21 which may be formed as an integral axial extension of the drums 2 and 20. An index 3 cooperates with the scale 1 to indicate the depth of liquid. As may be seen in Figure 4, the index 3 may be provided with a heel 30 which is received in the helical groove 11 of the cylinder 10, and by this engagement the index 3, slidably supported upon a guide rod 31 which parallels the axis of the drum 2 and cylinder 21, is guided for traversing movement, and thus the index at all times cooperates with the scale 1 to indicate the level of liquid in the tank.

It will be evident that in installing the gauge, in connecting up the line 96 to the drum 2, and in other connections, there will be discrepancies, so that the index will seldom, if ever, accurately register on the scale the proper level in the tank, because it is not possible to make the various connections so accurately that this will be the case, and if by chance such accuracy should exist, any settling of the tank or stretching or shrinking of the line will disturb the relationship so that it no longer exists. To compensate for such inaccuracies the sleeve 10 is not formed as a part of the cylinder 21, but is received thereon, and is adjustable angularly relative to the cylinder. When the connections are all made, the ferrule 94 at the float end of the line 96 is brought up into engagement with the shoulder 98, which is a fixed and known distance from the bottom of the tank. This represents capacity filling of the tank, and the index 3 should then register with the capacity reading on the scale 1, with the line 96 wound upon its drum. If the index does not so register, the sleeve 10 is rotated until the index is brought to an accurate reading, whereupon a set screw 13 is tightened to hold the sleeve 10 fixed to the cylinder 21. Now as the cylinder 21 rotates with the drum 2 the scale 1 will at all times, and accurately, gauge the level of the liquid, and if this accuracy should be disturbed by settling or otherwise, adjustment can again be made to compensate therefor, in like manner.

It is desirable that all working parts be enclosed within the gauge box 8 so that there can be no unauthorized disturbance of the gauging parts, yet it may be necessary at times to remove the float 95, and it can only be removed through the extension 91. Since the drum and cylinder are immediately over the upper end of the extension 91, it is necessary that they be removable at such times, and in order to accomplish this I provide bearing plates 4 which may be secured from within the gauge box to each end thereof by means such as the machine screws 40. Preferably each of these bearing plates 4 is slotted, there being a slot 41 in each to receive trunnions 12 at the end of the combined drum and cylinder, and another slot 43, preferably angularly disposed, is provided in each bearing plate for the reception of the flattened end of the guide rod 31. With this arrangement it is a simple matter to withdraw the ends of the guide rod 31 and the trunnions 12 from their respective slots, and thus to leave free the upper end of the pipe branch 91.

In order to prevent disconnection of the entire gauge from the branch 91 I prefer that this connection be accessible only from within the gauge box, and as shown in Figure 1, the upper end of the extension 91 is provided with a flange 99 whereon rests a downward, inwardly flanged extension 89 of the gauge box, and a nut 88, threading on the end of the extension 91 which lies within the extension 89, secures the gauge box to the pipe extension, and this connection cannot be disturbed until the cover 89 and the drum and cylinder are removed.

It will be noted that the drum 20 forms in effect a spacer between the larger drum 2 and cylinder 21. The space thus formed is located in registry with the bore of the pipe 90, 91, and enables insertion of a small rod to reach the bottom of the tank, whereby the accuracy of the gauge can be checked from time to time, without removal or disturbance of any part of the gauge.

What I claim as my invention is:

1. A tank float gauge for use with a float and a line extending therefrom, comprising a gauge box, a pair of bearing plates securable within the ends of the box, and having each two slots, a combined drum and helical scale having trunnions receivable in and removable from a slot in each bearing plate, to rotate thereon, said line being wound upon said drum, means to keep the line tight, a guide rod disposed in and removable from the second slots in the bearing plates, paralleling the axis of the drum and scale, and an index slidable along said rod and engageable with the scale, to cooperate therewith in indicating the float level.

2. In combination with a tank and a pipe leading upward therefrom, a float within the tank insertible and removable through the pipe, a gauge box secured upon the upper end of the pipe by means accessible only from within the box, a line extending from the float upward through the pipe, a combined drum and scale removably received and journaled in said box, immediately above the end of the pipe, an index cooperating with the scale, the float line being wound about said drum, and the float being removable only when the drum has been removed.

3. A tank float gauge for use with a float and a line extending therefrom, comprising a casing, a rotative unit journaled within the casing and including a drum and a cylinder, said drum being adapted to receive said float line, a guide rod in said casing disposed parallel to the axis of the drum and cylinder, an index movable therealong, and having a heel, a helically grooved sleeve bearing scale markings, the index heel being received in said groove, and the sleeve being received upon the cylinder, and means, releasable for angular adjustment of the sleeve relatively to the cylinder, for normally fixing the sleeve to the cylinder.

4. A tank float gauge for use with a float, a line extending therefrom, and a pipe through which the float line extends, comprising a casing of dimensions exceeding the diameter of the pipe, a rotative unit journaled within the casing and including a cylinder and two drums of different diameter, and both disposed in alignment with the pipe, the drum of smaller diameter being of less diameter than the pipe, thereby affording access to the pipe for measurement by a gauge stick, a counterweighted line received upon the smaller drum, the float line being received on the larger drum, and the cylinder having scale markings, and an index cooperating with the scale markings to indicate, as the cylinder revolves, the position of the float within the tank.

5. A tank float gauge for use with a float, a line extending therefrom, and a pipe through which the float line extends, comprising a casing of dimensions exceeding the diameter of the pipe, a rotative unit journaled within the casing and including a cylinder and two drums of different diameter, and both disposed in alignment with the pipe, the drum of smaller diameter being of less diameter than the pipe, thereby affording access to the pipe for measurement by a gauge stick, a counterweighted line received upon the smaller drum, the float line being received on the larger drum, and the cylinder bearing a helically disposed series of scale markings, and an index movable lengthwise of the cylinder in accordance with rotation of said unit, and cooperating with the scale markings to indicate the position of the float within the tank.

OLE B. ARNTZEN.